(12) United States Patent
Uehara et al.

(10) Patent No.: US 7,335,614 B2
(45) Date of Patent: *Feb. 26, 2008

(54) OPTICAL GLASS

(75) Inventors: Susumu Uehara, Sagamihara (JP); Koji Shimizu, Sagamihara (JP); Shinya Mashiko, Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/450,411

(22) Filed: Jun. 12, 2006

(65) Prior Publication Data

US 2006/0229186 A1 Oct. 12, 2006

Related U.S. Application Data

(62) Division of application No. 10/733,303, filed on Dec. 12, 2003, now Pat. No. 7,138,349.

(30) Foreign Application Priority Data

Dec. 17, 2002 (JP) ............................ 2002-365851

(51) Int. Cl.
C03C 3/068 (2006.01)
C03C 3/066 (2006.01)

(52) U.S. Cl. ......................... 501/78; 501/79

(58) Field of Classification Search ................ 501/78, 501/79
See application file for complete search history.

(56) References Cited

U.S. PATENT DOCUMENTS

| | | | |
|---|---|---|---|
| 4,226,627 A | 10/1980 | Inoue et al. | |
| 6,753,281 B2 | 6/2004 | Uehara | |
| 6,818,578 B2 | 11/2004 | Tachiwama | |
| 6,912,093 B2 | 6/2005 | Endo | |
| 6,977,232 B2* | 12/2005 | Hayashi et al. | 501/79 |
| 7,138,349 B2* | 11/2006 | Uehara et al. | 501/78 |
| 2002/0006857 A1 | 1/2002 | Tachiwama | |
| 2003/0100433 A1* | 5/2003 | Hayashi et al. | 501/79 |
| 2003/0211929 A1 | 11/2003 | Hayashi et al. | |
| 2004/0235638 A1* | 11/2004 | Uehara et al. | 501/78 |
| 2005/0107240 A1 | 5/2005 | Uehara | |
| 2006/0234850 A1* | 10/2006 | Hayashi et al. | 501/78 |

FOREIGN PATENT DOCUMENTS

| | | |
|---|---|---|
| JP | 52-14607 | 2/1977 |
| JP | 52-129716 | 10/1977 |
| JP | 52-155614 | 12/1977 |
| JP | 53-4023 | 1/1978 |
| JP | 53-47368 | 12/1978 |
| JP | 54-002646 | 1/1979 |
| JP | 54-6042 | 1/1979 |
| JP | 54-2646 | 2/1979 |
| JP | 54-6242 | 3/1979 |
| JP | A 54-90218 | 7/1979 |
| JP | A 60-046948 | 3/1985 |
| JP | A 60-221338 | 11/1985 |
| JP | A 62-100449 | 5/1987 |
| JP | A 6-122526 | 5/1994 |
| JP | A 7-118033 | 5/1995 |
| JP | A 7-165431 | 6/1995 |
| JP | A 8-217484 | 8/1996 |
| JP | A 8-319214 | 12/1996 |
| JP | A 2001-348244 | 12/2001 |
| JP | A 2002-284542 | 10/2002 |
| JP | A 2003-267748 | 9/2003 |

* cited by examiner

Primary Examiner—J. A. Lorengo
Assistant Examiner—Elizabeth A. Bolden
(74) Attorney, Agent, or Firm—Oliff & Berridge, PLC

(57) ABSTRACT

An optical glass having a refractive index ($n_d$) and an Abbe number ($v_d$) which are within an area surrounded by the straight lines which are drawn by connecting point A ($n_d$=1.835, $v_d$=46.5), point B ($n_d$=1.90, $v_d$=40.0), point C ($n_d$=1.90, $v_d$=35.0) and point D ($n_d$=1.835, $v_d$=38.0) in a sequence of A, B, C, D and A as border lines in x-y coordinates shown in FIG. 1, in which X-axis is the Abbe number ($v_d$) and Y-axis is the refractive index ($n_d$), the area including the border line. The optical glass has low glass transition temperature (Tg), and suitable for precision mold pressing.

32 Claims, 1 Drawing Sheet

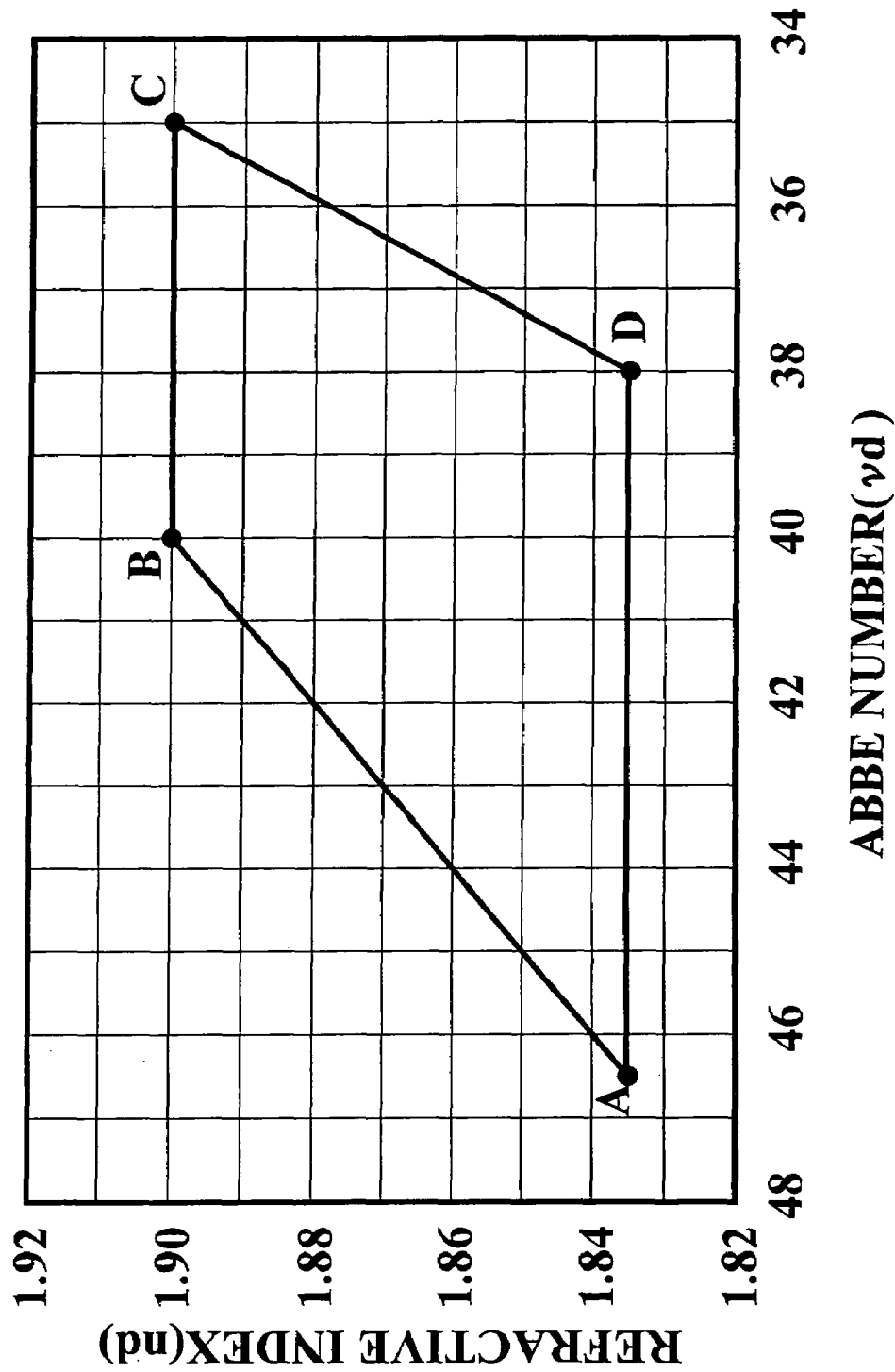

OPTICAL GLASS

This is a Division of application Ser. No. 10/733,303 filed Dec. 12, 2003. The entire disclosure of the prior application is hereby incorporated by reference in its entirety.

BACKGROUND OF THE INVENTION

1. Field of the Invention

The present invention relates to a glass preform material used in precision mold pressing and an optical glass suitable for precision mold pressing, which have low dispersion and high refractive index and low transition point (Tg).

2. Description of Related Art

In late years, in optical instruments remarkably getting smaller and lighter, an aspherical lens is often applied in order to decrease the number of lenses constituting an optical system of an optical instrument. A method in which a lens is produced by press forming a heat-softened glass preform material with a metal molding die having precise molding surface, or a precision mold pressing, is a mainstream of manufacturing a glass aspherical lens.

Since the glass molding obtained by precision mold pressing is available as final products without or almost without grinding and polishing after forming, a lens and the like can be manufactured in high productivity with precision mold pressing. Precision mold pressing method is a suitable method for manufacturing a glass aspherical lens because it is difficult to manufacture an aspherical lens in large amount at a low cost in a former method including grinding and polishing. Furthermore, a precision mold pressing method has high productivity. As a result, spherical lenses and other optical elements of various shapes as well as an aspherical lens are manufactured in a precision mold pressing.

There are two major methods of manufacturing the glass preform material for precision glass forming.

One of these methods is: as disclosed in Japanese Patent Application Publication (Unexamined) Tokukaihei-6-122526 and Tokukaihei-8-319124, flowing molten glass from a discharge pipe, cutting the flowed glass while the flowed glass keeps on a molding die, and successively forming glass preform material; or, as disclosed in Japanese Patent Application Publication (Unexamined) Tokukaihei-7-165431, dropping molten glass from a flow-controlled pipe, keeping the droplets on lower molding die, and forming a glass preform material by pressing the kept glass lump with upper molding die. These methods have high productivity of a glass preform material itself because a glass preform material is directly obtained by hot forming of molten glass in both methods.

The other method is one obtaining a glass preform material by cutting a glass block material. There is a problem in this method that many processes are required from cutting a glass block material to shaping a glass close to a final product. However, there is an advantage that shape variation in precision mold pressing can be reduced on a occasion of obtaining a final product of various shapes such as a lens by precision mold pressing since the glass preform material can be shaped close to a final product such as a lens.

In obtaining a glass molding with precision mold pressing, a heat-softened glass preform material is required to be press formed under high temperature condition in order to print precise molding surface of metal molding die to the glass preform material. Therefore, the applied metal molding die is also exposed to high temperature, and furthermore, to high pressure. As a result, when a glass preform material is heat-softened and press-formed, a precise molding surface of metal molding die often cannot be maintained because of oxidation and erosion of the molding surface and a damage of a mold release membrane provided on the molding surface. Further, the metal molding die itself is damaged easily. Under these conditions, since the metal molding die is required to exchange frequently, the frequency of exchanging the metal molding die increases as a result, the manufacturing in large amount at low cost cannot to be achieved. The transition temperature (Tg) of a glass for a glass preform material used in precision mold pressing is desirably as low as possible from the viewpoints of reducing the above-described damage, maintaining precise molding surface of a metal molding die for a long period and permitting precision mold pressing with low pressure. At present, since a glass of the glass preform material for precision mold pressing having transition point (Tg) of more than 650° C. is difficult to be applied to precision mold pressing, a high refractive index and low dispersion glass having transition temperature (Tg) of not more than 650° C. is required, preferably the transition temperature (Tg) of not more than 640° C., more preferably the transition temperature (Tg) of not more than 630° C. Further, since a devitrification of the glass preform material does not disappear by precision mold pressing, and since a devitrified glass molding cannot be used as an optical element such as a lens, the glass of a glass preform material for precision mold pressing is required to have superior resistance to devitrification property.

As for the property of an optical glass used for an aspherical lens, various optical constants (refractive index ($n_d$) and Abbe number ($v_d$)) are required. Among them, the glasses having high refractive index and low dispersion are required in recent years. Particularly, for an optical design, high refractive index and low dispersion glass is strongly required, wherein a refractive index ($n_d$) and an Abbe number ($v_d$) are within an area surrounded by straight lines that are drawn by connecting point A ($n_d$=1.835, $v_d$=46.5), point B ($n_d$=1.90, $v_d$=40.0), point C ($n_d$=1.90, $v_d$=35.0) and point D ($n_d$=1.835, $v_d$=38.0) in a sequence of A, B, C, D and A as border lines in x-y orthogonal coordinates shown in FIG. 1, in which X-axis is the Abbe number ($v_d$) and Y-axis is the refractive index ($n_d$), the area including the border lines (hereinafter, the above-described area is referred to as a specific area). In particular, an optical glass having the optical constants within the specific area and refractive index ($n_d$) more than 1.85 and less than 1.875, an optical glass having the optical constants within the specific area and Abbe number ($v_d$) less than 39.5 and the like are required.

Cadmium and thorium components have been known for a long time as ingredients providing high refractive index to a glass. However, it is well known that these ingredients cause environmental damage.

A glass containing lead such as PbO is known as a glass having a high refractive index and a low transition temperature (Tg). Since a glass containing lead easily fuses with a metal molding die in precision mold pressing, it is difficult to use a metal molding die repeatedly. Therefore, it is not suitable for a glass of precision mold pressing. Furthermore, for the sake of unfavorable environmental effect of lead, there is a problem that some kinds of environmental measures are required in manufacturing, coolworking such as polishing, disposal and the like of a glass containing lead. There is also a movement to prohibit manufacture, usage and the like of a glass containing lead.

For these reasons an optical glass having high refractive index and low dispersion, low transition temperature, and containing no lead is strongly required.

Since a high refractive index and low dispersion optical glass is useful for a spherical lens as well as an aspherical lens from a viewpoint of optical design, various kinds of the glasses have been suggested for long. For example, Japanese Patent Application Publication (Unexamined) Tokukaisho-52-14607 (hereinafter referred to as Publication 1) discloses a $B_2O_3$—$SiO_2$—$La_2O_3$—$Gd_2O_3$—$ZrO_2$+$Ta_2O_5$ system optical glass. The glass disclosed in Publication 1 does not fulfill the recent above-described requirement for optical design, because the refractive index is low and the optical constants is not within the above-described specific area. Further it is difficult to perform the precision mold pressing for the sake of its high transition temperature (Tg).

Japanese Patent Application Publication (Unexamined) Tokukaisho-52-155614 (hereinafter referred to as Publication 2) discloses a $B_2O_3$—$La_2O_3$—$Gd_2O_3$—$WO_3$—$ZrO_2$+$Ta_2O_5$ system high refractive index and low dispersion optical glass. Though the optical glass disclosed in Publication 2 has the optical constants within the above-described specific area, it is difficult to perform the precision mold pressing for the sake of its high transition temperature (Tg).

Japanese Patent Application Publication (Examined) Tokukousho-54-2646 discloses a $SiO_2$—$B_2O_3$—$La_2O_3$—$Ta_2O_5$+ZnO system high refractive index and low dispersion optical glass. It is difficult that the optical glass disclosed on this publication is applied to precision mold pressing for the sake of its high transition temperature (Tg).

Japanese Patent Application Publication (Examined) Tokukousho-53-4023 discloses a $B_2O_3$—$La_2O_3$—$HfO_2$ system high refractive index and low dispersion optical glass. It is difficult that the optical glass disclosed on this publication is applied to precision mold pressing for the sake of its high transition temperature (Tg).

Japanese Patent Application Publication (Unexamined) Tokukaisho-54-90218 (hereinafter referred to as Publication 3) discloses a $SiO_2$—$B_2O_3$—$La_2O_3$—$WO_3$—$Ta_2O_5$—$Gd_2O_3$—$ZrO_2$ system high refractive index and low dispersion optical glass. It is difficult that the glass practically disclosed in Publication 2 is applied to precision mold pressing for the sake of its high transition temperature (Tg).

Japanese Patent Application Publication (Unexamined) Tokukaisho-52-129716 and Japanese Patent Application Publication (Examined) Tokukousho-54-6042 (hereinafter referred to as Publication 4) discloses a $B_2O_3$—$La_2O_3$—$Y_2O_3$—$ZrO_2$—$WO_3$—$Ta_2O_5$+$Nb_2O_5$+$TiO_2$ system high refractive index and low dispersion optical glass. It is difficult that both of the glasses disclosed in these publications are applied to precision mold pressing for the sake of their high transition temperature (Tg).

Japanese Patent Application Publication (Unexamined) Tokukaisho-60-46948 discloses a $SiO_2$—$B_2O_3$—$La_2O_3$—$Yb_2O_3$—$Nb_2O_5$—$Ta_2O_5$ system high refractive index and low dispersion optical glass. It is difficult that the glass practically disclosed in this publication is applied to precision mold pressing for the sake of its high transition temperature (Tg).

Japanese Patent Application Publication (Unexamined) Tokukaisho-60-221338 discloses a $B_2O_3$—$La_2O_3$—$Y_2O_3$-bivalent metal oxide-$Li_2O$ system optical glass having low transition temperature (Tg). Since the glass practically disclosed on this publication does not have the optical constants within the above-described specific area, it does not fulfill the above-described recent requirement for optical design.

Japanese Patent Application Publication (Unexamined) Tokukaisho-62-100449 discloses a $B_2O_3$—$La_2O_3$—$ZnO$—$Li_2O$—$Sb_2O_3$ system optical glass having low transition temperature (Tg). Since this glass disclosed on this publication contains much $Sb_2O_3$ as an essential component, in obtaining a glass preform material in hot forming, selective volatilization of $Sb_2O_3$ component form the surface layer of fused glass tend to cause the surface striae. The surface striae does not disappear by precision mold pressing, and a glass molding having surface striae does not used for optical elements such as lenses. Therefore, it is not suitable for the glass preform material for precision mold pressing. Further, on precision mold pressing of a glass preform material, $Sb_2O_3$ component selectively volatilized from the surface layer of a glass preform material adheres to the molding surface of a metal molding die to cause haze on the molding surface of a metal molding die. If the hazed metal die is used repeatedly, the haze itself is transferred to the surface of a glass molding, or the haze pattern is printed to the surface of a glass molding. Since a glass molding with these problems cannot be used as an optical element such as a lens, it is not suitable for mass production of optical elements such as lenses by precision mold pressing. Furthermore, since the glass practically disclosed on this publication does not have the optical constants within the above-described specific area, it does not fulfill the above-described recent requirement for optical design.

Japanese Patent Application Publication (Unexamined) Tokukaihei-8-217484 (hereinafter referred to as Publication 5) discloses a $B_2O_3$—$La_2O_3$—$Lu_2O_3$ system optical glass. Since the $Lu_2O_3$ component contained in this glass as essential component is remarkably expensive, this glass has little practical use because of very high production cost. Among the glasses disclosed on Publication 5, it is difficult that the glasses having the optical constants within the above-described specific area is applied to precision mold pressing for the sake of high transition temperature (Tg).

Japanese Patent Application Publication (Unexamined) Tokukai-2001-348244 (hereinafter referred to as Publication 6) discloses optical glass having glass transition point of not more than 700° C. and optical property of high refractive index and low dispersion. It is difficult that a glass practically disclosed on Publication 6 is applied to precision mold pressing for the sake of high glass transition point (Tg), or transition temperature (Tg).

Japanese Patent Application Publication (Unexamined) Tokukai-2003-267748 (hereinafter referred to as Publication 7) discloses a high refractive index and low dispersion optical glass having low Tg. The glass practically disclosed in Publication 7 having the optical constants within the above-described specific area has a defect of having a difficulty in manufacturing a glass preform material for the sake of its low resistance to devitrification property. Further, there is also a defect that transmission factor in short visible wavelength range is low since a lot of $WO_3$ and $TiO_2$ is contained.

As described above, high refractive index and low dispersion optical glasses according to an earlier development have problems mainly that: though transition temperature is low, its optical constants is not within the above-described specific area strongly required in late years; or that, though its optical constants is within the above-described specific area, the transition temperature (Tg) is high, which cause a difficulty of precision mold pressing.

SUMMARY OF THE INVENTION

An object of the present invention is to resolve the defects of the optical glass described in Description of Related Art, and to provide an optical glass which has optical constants within the above-described specific area and a low transition temperature (Tg), and which is suitable for a glass preform material for precision mold pressing and precision mold pressing, and furthermore, is free from cadmium component, thorium component and lead component in order to have low environmental burden.

In order to accomplish the above-described object, the inventors has examined and researched an optical lens. As a result, the inventors have found an optical glass which has optical constants in a specific range and low transition temperature (Tg) at which precise press forming can be performed, and which is suitable for a glass preform material for precision mold pressing and precision mold pressing, and is available for precision mold pressing. Thus, the inventors have accomplished the following invention.

According to a first aspect of the present invention, an optical glass has;

a refractive index ($n_d$) and an Abbe number ($v_d$) which are within an area surrounded by straight lines that are drawn by connecting point A ($n_d$=1.835, $v_d$=46.5), point B ($n_d$=1.90, $v_d$=40.0), point C ($n_d$=1.90, $v_d$=35.0) and point D ($n_d$=1.835, $v_d$=38.0) in a sequence of A, B, C, D and A as border lines in x-y orthogonal coordinates shown in FIG. 1, in which X-axis is the Abbe number ($v_d$) and Y-axis is the refractive index ($n_d$), the area including the border lines: and the optical glass comprises:

0.1 to 8 mass % of $SiO_2$;
5 to less than 20 mass % $B_2O_3$;
15 to 50 mass % of $La_2O_3$;
0.1 to 30 mass % $Gd_2O_3$;
0 to 10 mass % of $GeO_2$ and
0 to 8 mass % of $Nb_2O_5$,
where a total content of $Gd_2O_3$, $GeO_2$ and $Nb_2O_5$ is more than 10 mass % to 30 mass %;
0 to 5 mass % of $Yb_2O_3$;
0 to 1 mass % of $TiO_2$;
0 to 8 mass % of $ZrO_2$;
more than 10 to 25 mass % of $Ta_2O_5$;
0 to 10 mass % of $WO_3$;
0 to 15 mass % of ZnO;
0 to 5 mass % of RO,
where RO is one or more kinds of oxides selected from CaO, SrO and BaO;
more than 0.5 to less than 3 mass % of $Li_2O$;
0 to 1 mass % of $Sb_2O_3$; and
0.1 to 6 mass % a the total content of fluorides of above-described metal elements as F element with which a part or all of one or more kinds of oxides of above-described metal elements are substituted;
wherein the optical glass is free from cadmium, thorium, $Y_2O_3$, $P_2O_5$, and $TeO_2$, and
the optical glass has a transition temperature (Tg) of 550 to 650° C.

The above-described optical glass preferably comprises 0.1 to less than 5.5% of $SiO_2$.

The above-described optical glass preferably comprised more than 1 to less than 3% of $Li_2O$.

The above-described optical glass may have the refractive index ($n_d$) of less than 1.875.

The above-described optical glass may have the refractive index ($n_d$) of 1.875 or more.

The above-described optical glass may have the refractive index ($n_d$) of more than 1.85.

The above-described optical glass may have the Abbe number ($v_d$) of less than 39.5.

The above-described optical glass may have the Abbe number ($v_d$) of 39.5 and more.

The above-described optical glass preferably has the transition temperature (Tg) of 640° C. or less.

The above-described optical glass preferably has the transition temperature (Tg) of 630° C. or less.

According to the second aspect of the present invention, an optical glass has;

a refractive index (nd) and an Abbe number (vd) which are within an area surrounded by straight lines that are drawn by connecting point A (nd=1.835, vd=46.5), point B (nd=1.90, vd=40.0), point C (nd=1.90, vd=35.0) and point D (nd=1.835, vd=38.0) in a sequence of A, B, C, D and A as border lines in x-y orthogonal coordinates shown in FIG. 1, in which X-axis is the Abbe number (vd) and Y-axis is the refractive index (nd), the area including the border lines: and the optical glass comprises;

0.1 to 8 mass % of $SiO_2$;
5 to less than 20 mass % $B_2O_3$;
15 to 50 mass % of $La_2O_3$;
0.1 to 30 mass % $Gd_2O_3$,
more than 10 to 25 mass % of $Ta_2O_5$; and
more than 0.5 to less than 3 mass % of $Li_2O$;
and
0 to 10 mass % of $GeO_2$ and/or
0 to 8 mass % of $Nb_2O_5$,
where a total content of $Gd_2O_3$, $GeO_2$ and $Nb_2O_5$ is more than 10 mass % to 30 mass %;
and/or
0 to 5 mass % of $Yb_2O_3$; and/or
0 to 1 mass % of $TiO_2$; and/or
0 to 8 mass % of $ZrO_2$; and/or
0 to 10 mass % of $WO_3$; and/or
0 to 15 mass % of ZnO; and/or
0 to 5 mass % of RO,
where RO is one or more kinds of oxides selected from CaO, SrO and BaO;
0 to 1 mass % of $Sb_2O_3$; and/or
0 to less than 0.5 mass % of $Lu_2O_3$; and
0.1 to 6 mass % of the total content of fluorides of above-described metal elements as F element with which a part or all of one or more kinds of oxides of above-described metal elements are substituted;
wherein the optical glass is free from cadmium, thorium, $Y_2O_3$, $P_2O_5$ and $TeO_2$, and
the optical glass has a transition temperature (Tg) of 550 to 650° C.

The above-described optical glass preferably comprises 0.1 to less than 5.5% of $SiO_2$.

The above-described optical glass preferably comprises more than 1 to less than 3% of $Li_2O$.

The above-described optical glass may have the refractive index ($n_d$) of less than 1.875.

The above-described optical glass may have the refractive index ($n_d$) of 1.875 or more.

The above-described optical glass may have the refractive index ($n_d$) of more than 1.85.

The above-described optical glass may have the Abbe number ($v_d$) of less than 39.5.

The above-described optical glass may have the Abbe number ($v_d$) of 39.5 and more.

The above-described optical glass preferably has the transition temperature (Tg) of 640° C. or less.

The above-described optical glass preferably has the transition temperature (Tg) of 630° C. or less.

BRIEF DESCRIPTION OF THE DRAWINGS

FIG. 1 is X-Y orthogonal coordinates in which X-axis is an Abbe number ($v_d$) and Y-axis is a refractive index ($n_d$), and which shows the range of optical constants (Abbe number ($v_d$) and refractive index ($n_d$)) of the optical glass of the present invention.

DETAILED DESCRIPTION OF THE PREFERRED EMBODIMENT

Hereinafter, the reasons why the composition range in mass % of each components are limited as described above in an optical glass of the present invention will be explained below.

The $SiO_2$ component is an effective component in increasing the viscosity and improving the resistance to devitrification property of the optical glass of the present invention. However, when the content thereof is less than 0.1%, it becomes difficult to obtain the above-described effect efficiently. Further, when the glass contains the $SiO_2$ component excessively, it is not preferable that transition temperature (Tg) becomes high. In order to facilitate obtaining an optical glass having sufficient resistance to devitrification property and desired low transition temperature (Tg), the content of $SiO_2$ component is preferably 0.1% or more, more preferably 0.5% or more and the most preferably 1% or more, and is preferably 8% or less, more preferably 6% or less and the most preferably less than 5.5%.

The $B_2O_3$ component is an essential component as a glass consisting oxide component according to the Lanthanum system optical glass of the present invention. However, when its content is less than 5%, the resistance to devitrification property becomes insufficient, and when it is not less than 20%, its chemical durability degrades. Therefore, the optical glass of the present invention contains preferably 5% or more, more preferably 6% or more and the most preferably 8% or more, and contains preferably less than 20%, more preferably 19.5% or less and the most preferably 19% or less of $B_2O_3$ component.

The $La_2O_3$ component is effective in increasing refractive index and decreasing dispersion and is essential for the glass of the present invention having high refractive index and low dispersion. However, when its content is 15% or less, it is difficult to keep the optical constants within the above-described specific area. On the other hand, when the glass contains the $La_2O_3$ component excessively, the resistance to devitrification degrades. Therefore, in order to obtain particularly fine resistance to devitrification property while the optical constants of the glass is kept within the above-described specific area, the glass contains preferably 15% or more, more preferably 18% or more, and the most preferably 20% or more, and contains preferably not more than 50%, more preferably less than 47%, and the most preferably not more than 45% of $La_2O_3$ component.

$Gd_2O_3$ component is effective in increasing refractive index and decreasing dispersion of a glass. However, when its content is less than 0.1%, the above-described effect is not sufficient, and on the contrary when the glass contains the $Gd_2O_3$ component excessively, resistance to devitrification property degrades. Therefore, the optical glass of the present invention contains preferably 0.1% or more, more preferably 0.5% or more and the most preferably 1% or more, and contains preferably 30% or less, more preferably less than 28% and the most preferably 25% or less of $Gd_2O_3$ component.

The $Nb_2O_5$ component is effective in increasing refractive index and improving chemical durability and resistance to devitrification property. On the contrary the resistance to devitrification property degrades when the glass contains the $Nb_2O_5$ component excessively. Therefore, in order to facilitate obtaining the above-described effect, the content thereof is preferably 0.1% or more. Furthermore, the content thereof is preferably 8% or less, more preferably 7% or less and the most preferably 6% or less in order to obtain the fine resistance to devitrification property.

The $GeO_2$ component is effective component in increasing refractive index and improving resistance to devitrification property. However, it is extremely expensive. Therefore, the glass of the present invention contains preferably 10% or less, more preferably 8% or less and the most preferably 6% or less of $GeO_2$ component.

When the total content of the $Gd_2O_3$, the $Nb_2O_5$ and the $GeO_2$ components is less than 10%, the resistance to devitrification property is insufficient, and when the total content is more than 30%, the resistance to devitrification property is insufficient all the same. Furthermore, since the materials of these three components are all expensive, it is not preferable to add excessively from the viewpoint of production cost. Therefore, according to the optical glass of the present invention, the total content of the $Gd_2O_3$, the $Nb_2O_5$ and the $GeO_2$ components is controlled preferably more than 10%, more preferably 10.5% or more and the most preferably 11% or more, and also controlled preferably 30% or less, more preferably 28% or less and the most preferably 25% or less.

The $Yb_2O_3$ component is effective in increasing the refractive index and decreasing the dispersion of the glass. However, when the glass contains the $Yb_2O_3$ component excessively, the resistance to devitrification property degrades. Therefore, the optical glass of the present invention contains preferably 5% or less, more preferably 4% or less and the most preferably 3.5% or less of $Yb_2O_3$.

The $TiO_2$ component has the effects of regulating optical constants and improving resistance to devitrification property. However, when the glass contains the $TiO_2$ component excessively, the resistance to devitrification property degrades. Therefore, the glass of the present invention contains preferably 1% or less, more preferably 0.8% or less and the most preferably 0.5% or less of $TiO_2$.

The $ZrO_2$ component has effects of regulating optical constants and improving resistance to devitrification property and chemical durability. However, when the glass contains the $ZrO_2$ component excessively, the resistance to devitrification property degrades to the contrary, and it becomes difficult to obtain desired low transition temperature (Tg). Therefore, the glass of the present invention contains preferably 8% or less, more preferably less than 8% and the most preferably 7.5% or less of $ZrO_2$. Particularly in order to facilitate obtaining the above-described effect, the content is preferably 0.1% or more.

The $Ta_2O_5$ component has the effects of increasing refractive index and improving chemical durability and resistance to devitrification property. When the content thereof is 10% or less, no remarkable effect is seen, and when it is more than 25%, resistance to devitrification property degrades to the contrary.

Therefore, in order to obtain the optical glass of the present invention having enough chemical durability and resistance to devitrification property while the refractive index is kept in the desired range, the content is preferably more than 10%, more preferably 14% or more and the most preferably more than 19%. In addition, the upper limit is 25%.

The $WO_3$ component has the effects of regulating optical constants and improving resistance to devitrification property. However, when the glass contains the $WO_3$ component excessively, the resistance to devitrification property and the light transmittance in shorter wavelength range of visible range decreases. Therefore, the glass of the present invention contains preferably 10% or less, more preferably 8% or less and the most preferably 6% or less of the $WO_3$. In particular, in order to facilitate obtaining the glass having superior light transmittance in shorter wavelength range of visible range, it is preferable that the content is less than 2%.

The ZnO component has a large effect of lowering transition temperature (Tg). However, when the glass contains the ZnO component excessively, resistance to devitrification property degrades. Therefore, the glass of the present invention contains preferably 15% or less, more preferably 13% or less and the most preferably 10% or less of ZnO. In addition, in order to facilitate obtaining the above-described effect, it is preferable that the content is 0.1% or more.

The RO component, which is one or more kinds of the components selected from CaO, SrO and BaO, is effective in regulating optical constants. However, when the total content of CaO, SrO and BaO components exceed 5%, the resistance to devitrification property degrades. Therefore, according to the glass of the present invention, the total content of CaO, SrO and BaO is preferably 5% or less, more preferably 4% or less and the most preferably 3% or less.

The $Li_2O$ component has the effects of lowering transition temperature (Tg) to a large degree and promoting the melting of the mixed glass materials. However, when the content thereof is 0.5% or less, these effects are insufficient, and when the glass contains the $Li_2O$ component excessively, resistance to devitrification property degrades to the contrary. Therefore, the glass of the present invention contains less than 3%, preferably 2.5% or less and the most preferably 2% or less of the $Li_2O$. In order to facilitate obtaining the glass having even lower transition temperature (Tg), the content is more than 0.5%, preferably 0.6% or more and the most preferably more than 1%.

The $Sb_2O_3$ component can be added to the molten glass for defoaming. The content is preferably 1% and less, more preferably 0.8% and less and the most preferably 0.5% and less.

The $Lu_2O_3$ component has the effect of improving resistance to devitrification property when extremely small amount is added to the glass of the composition system according to the present invention. Since the material of the $Lu_2O_3$ component is extremely expensive, when the glass contains the $Lu_2O_3$ component excessively, the glass is not practical because of its high production cost. Furthermore, the resistance to devitrification property degrades. Therefore, the glass of the present invention contains preferably less than 0.5%, more preferably 0.45% or less and the most preferably 0.4% or less of $Lu_2O_3$.

The F component is effective in decreasing the dispersion of a glass, lowering transition temperature (Tg) and improving resistance to devitrification property. In particular, as the inventors have found out, when the F component coexists with $La_2O_3$ component, the high refractive index and low dispersion optical glass is successful in having the optical constants within the above-described specific area and the low transition temperature (Tg) at which precision mold pressing can be performed. Therefore, F component is extremely important component in the glass of the present invention.

A part or all of one kind or two or more kinds of metal oxide of the each above-described metal element is substituted with the metal fluoride thereof. When the total content of the fluoride calculated as F element is less than 0.1%, the above-described effects of the F component are insufficient, and when it is more than 6%, it becomes difficult to obtain a uniform glass since the volatilization amount of the F component increases. In order to facilitate obtaining the above-described effects, the glass of the present invention contains preferably 6% or less, more preferably 5.5% or less and the most preferably 5% or less, and contains preferably 0.1% or more, more preferably 0.2% or more and the most preferably 0.5% or more of the F component.

Next, the components that should not be contained in the glass of the present invention will be explained. As described above, there are problems in lead component that the lead contained glass easily fuses with a metal molding die in precision mold pressing, and that some kind of environmental measures for the sake of unfavorable environmental effect of lead are required not only in manufacturing, but also coolworking such as polishing, disposal and the like of the glass. Therefore, the optical glass of the present invention should not contain the lead component, because the lead component has large environmental burden.

Both of the cadmium and the thorium components have harmful effects to the environment and large environment burden. Therefore, the glass of the present invention should not contain them.

The $P_2O_5$ tends to have the effect of degrading resistance to devitrification property of the optical glass of the present invention. Therefore, it is not preferable that the glass contains $P_2O_5$ component.

With respect to the $Y_2O_3$, the inventors have found that resistance to devitrification property of the optical glass of the present invention degrades unexpectedly when it contains the $Y_2O_3$ component. Therefore, the glass should not contain it.

With respect to the $TeO_2$, when a glass material is melted in a platinum crucible or a melting tank in which the part exposed to molten glass is made of platinum, the platinum is alloyed with the tellurium. The heat resistance degrades in the alloyed part. The risk of alloyed part melting to be a hole and molten glass flowing out is concerned. Therefore, the optical glass of the present invention should not contain the $TeO_2$.

EXAMPLES

The Examples of the present invention will be explained below. However, it is needless to say that the present invention is not limited to such Examples.

Tables 1 to 6 show the composition of the examples according to the glass of the present invention (No. 1 to No. 32) together with their refractive index ($n_d$), Abbe number ($v_d$) and transition temperature (Tg).

Tables 7 and 8 show the composition of the glass of the comparative examples (No. A to No. H) together with their refractive index ($n_d$), Abbe number ($v_d$) and transition temperature (Tg).

Table 9 shows the results of a devitrification test of the example of the present invention (No. 17, 25, 28 and 30) and the comparative examples (No. I, J and K).

TABLE 1

| | EXAMPLE COMPOSITION (mass %) No. | | | | | |
|---|---|---|---|---|---|---|
| | 1 | 2 | 3 | 4 | 5 | 6 |
| $SiO_2$ | 5.49 | 5.39 | 5.39 | 1.77 | 1.56 | 5.44 |
| $B_2O_3$ | 12.51 | 10.76 | 10.35 | 19.94 | 19.71 | 10.30 |
| $La_2O_3$ | 36.81 | 37.94 | 38.55 | 39.53 | 40.38 | 38.55 |
| $Gd_2O_3$ | 16.37 | 16.08 | 16.08 | 9.02 | 4.92 | 14.05 |
| $ZrO_2$ | 6.22 | 7.13 | 7.13 | 6.40 | 6.36 | 7.12 |
| $Nb_2O_5$ | 1.04 | 1.02 | 2.04 | 1.54 | 5.09 | 2.04 |
| $Ta_2O_5$ | 19.38 | 19.54 | 18.02 | 15.86 | 15.77 | 18.02 |
| $ZnO$ | 1.04 | 1.02 | 1.02 | 5.12 | 5.09 | 1.02 |
| $Li_2O$ | 1.04 | 1.02 | 1.32 | 0.72 | 1.02 | 1.32 |
| $Sb_2O_3$ | 0.10 | 0.10 | 0.10 | 0.10 | 0.10 | 0.10 |
| $GeO_2$ | | | | | | 2.04 |
| $Gd_2O_3 + Nb_2O_5 + GeO_2$ | 17.41 | 17.10 | 18.12 | 10.56 | 10.01 | 18.13 |
| TOTAL AMOUNT | 100 | 100 | 100 | 100 | 100 | 100 |
| F | 3.63 | 1.78 | 1.78 | 4.02 | 2.96 | 1.78 |
| nd | 1.852 | 1.879 | 1.880 | 1.838 | 1.851 | 1.878 |
| νd | 41.6 | 40.6 | 40.3 | 42.7 | 40.3 | 40.1 |
| Tg (° C.) | 610 | 630 | 613 | 592 | 583 | 621 |

TABLE 2

| | EXAMPLE COMPOSITION (mass %) No. | | | | | |
|---|---|---|---|---|---|---|
| | 7 | 8 | 9 | 10 | 11 | 12 |
| $SiO_2$ | 5.44 | 1.56 | 5.44 | 5.44 | 5.44 | 5.44 |
| $B_2O_3$ | 10.30 | 16.68 | 10.30 | 10.30 | 10.30 | 10.30 |
| $La_2O_3$ | 38.05 | 38.15 | 38.05 | 38.05 | 38.05 | 38.05 |
| $Gd_2O_3$ | 14.05 | 10.18 | 13.03 | 13.74 | 10.74 | 12.74 |
| $Yb_2O_3$ | | | | | 3.00 | |
| $TiO_2$ | | | | | | 1.00 |
| $ZrO_2$ | 6.10 | 6.35 | 7.12 | 6.10 | 6.10 | 6.10 |
| $Nb_2O_5$ | 2.55 | 5.09 | 2.55 | 2.55 | 2.55 | 2.55 |
| $Ta_2O_5$ | 20.05 | 15.78 | 20.05 | 20.36 | 20.36 | 20.36 |
| $ZnO$ | | 5.09 | | | | |
| $Li_2O$ | 1.32 | 1.02 | 1.32 | 1.32 | 1.32 | 1.32 |
| $Sb_2O_3$ | 0.10 | 0.10 | 0.10 | 0.10 | 0.10 | 0.10 |
| $GeO_2$ | 2.04 | | 2.04 | 2.04 | 2.04 | 2.04 |
| $Gd_2O_3 + Nb_2O_5 + GeO_2$ | 18.64 | 15.27 | 17.62 | 18.33 | 15.33 | 17.33 |
| TOTAL AMOUNT | 100 | 100 | 100 | 100 | 100 | 100 |
| F | 1.78 | 1.78 | 1.78 | 1.78 | 1.78 | 1.78 |
| nd | 1.881 | 1.874 | 1.885 | 1.882 | 1.880 | 1.887 |
| νd | 39.7 | 40.1 | 39.3 | 39.4 | 39.5 | 39.1 |
| Tg (° C.) | 630 | 595 | 628 | 627 | 625 | 629 |

TABLE 3

| | EXAMPLE COMPOSITION (mass %) No. | | | | |
|---|---|---|---|---|---|
| | 13 | 14 | 15 | 16 | 17 |
| $SiO_2$ | 5.44 | 5.44 | 5.44 | 5.44 | 4.09 |
| $B_2O_3$ | 10.30 | 10.30 | 10.30 | 10.30 | 13.23 |
| $La_2O_3$ | 38.05 | 38.05 | 38.05 | 38.05 | 35.50 |
| $Gd_2O_3$ | 10.74 | 10.74 | 10.74 | 10.74 | 7.13 |
| $ZrO_2$ | 6.10 | 6.10 | 6.10 | 6.10 | 6.35 |
| $Nb_2O_5$ | 2.55 | 2.55 | 2.55 | 2.55 | 5.09 |
| $Ta_2O_5$ | 18.36 | 20.36 | 20.36 | 20.36 | 20.36 |
| $WO_3$ | 5.00 | | | | |
| $ZnO$ | | | | | 5.09 |
| $CaO$ | | 3.00 | | | |
| $SrO$ | | | 3.00 | | |
| $BaO$ | | | | 3.00 | |
| $Li_2O$ | 1.32 | 1.32 | 1.32 | 1.32 | 1.02 |
| $Sb_2O_3$ | 0.10 | 0.10 | 0.10 | 0.10 | 0.10 |
| $GeO_2$ | 2.04 | 2.04 | 2.04 | 2.04 | 2.04 |
| $Gd_2O_3 + Nb_2O_5 + GeO_2$ | 15.33 | 15.33 | 15.33 | 15.33 | 14.26 |
| TOTAL AMOUNT | 100 | 100 | 100 | 100 | 100 |
| F | 1.78 | 1.78 | 1.78 | 1.78 | 1.78 |
| nd | 1.881 | 1.874 | 1.874 | 1.874 | 1.882 |
| νd | 39.0 | 39.5 | 39.5 | 39.5 | 37.9 |
| Tg (° C.) | 622 | 619 | 620 | 618 | 604 |

TABLE 4

| | EXAMPLE COMPOSITION (mass %) No. | | | | |
|---|---|---|---|---|---|
| | 18 | 19 | 20 | 21 | 22 |
| $SiO_2$ | 5.44 | 5.44 | 5.45 | 1.56 | 2.67 |
| $B_2O_3$ | 12.34 | 12.34 | 9.28 | 14.14 | 14.65 |
| $La_2O_3$ | 37.03 | 32.03 | 39.06 | 39.67 | 37.54 |
| $Gd_2O_3$ | 13.03 | 13.03 | 11.71 | 7.13 | 5.09 |
| $ZrO_2$ | 6.10 | 6.10 | 6.10 | 6.35 | 6.35 |
| $Nb_2O_5$ | 2.55 | 2.55 | 2.55 | 5.09 | 5.09 |
| $Ta_2O_5$ | 19.34 | 19.34 | 20.36 | 15.78 | 20.36 |
| $ZnO$ | 3.05 | 8.05 | | 5.09 | 5.09 |
| $Li_2O$ | 1.02 | 1.02 | 1.32 | 1.02 | 1.02 |
| $Sb_2O_3$ | 0.10 | 0.10 | 0.10 | 0.10 | 0.10 |
| $GeO_2$ | | | 4.07 | 4.07 | 2.04 |
| $Gd_2O_3 + Nb_2O_5 + GeO_2$ | 15.58 | 15.58 | 18.33 | 16.29 | 12.22 |
| TOTAL AMOUNT | 100 | 100 | 100 | 100 | 100 |
| F | 1.78 | 1.78 | 1.78 | 1.78 | 1.78 |
| nd | 1.873 | 1.861 | 1.884 | 1.882 | 1.881 |
| νd | 40.0 | 39.8 | 39.2 | 38.6 | 38.0 |
| Tg (° C.) | 612 | 580 | 630 | 591 | 601 |

TABLE 5

| | EXAMPLE COMPOSITION (mass %) No. | | | | |
|---|---|---|---|---|---|
| | 23 | 24 | 25 | 26 | 27 |
| $SiO_2$ | 5.39 | 5.39 | 5.39 | 5.45 | 5.45 |
| $B_2O_3$ | 12.28 | 12.28 | 12.28 | 10.71 | 12.34 |
| $La_2O_3$ | 37.94 | 37.94 | 37.94 | 37.33 | 37.03 |
| $Gd_2O_3$ | 8.45 | 8.24 | 8.65 | 13.03 | 13.03 |
| $ZrO_2$ | 6.11 | 6.11 | 6.11 | 6.11 | 6.11 |
| $Nb_2O_5$ | 1.02 | 1.02 | 1.02 | 2.04 | 2.04 |
| $Ta_2O_5$ | 19.85 | 19.85 | 19.85 | 19.54 | 19.85 |
| $ZnO$ | 5.60 | 5.60 | 5.60 | 5.09 | 3.05 |
| $Li_2O$ | 1.02 | 1.02 | 1.02 | 0.61 | 1.02 |
| $Sb_2O_3$ | 0.10 | 0.10 | 0.10 | 0.10 | 0.10 |
| $GeO_2$ | 2.04 | 2.04 | 2.04 | | |
| $Lu_2O_3$ | 0.20 | 0.41 | | | |

TABLE 5-continued

EXAMPLE COMPOSITION (mass %)

| | No. | | | | |
|---|---|---|---|---|---|
| | 23 | 24 | 25 | 26 | 27 |
| $Gd_2O_3 + Nb_2O_5 + GeO_2$ | 11.50 | 11.30 | 11.70 | 15.06 | 15.06 |
| TOTAL AMOUNT | 100 | 100 | 100 | 100 | 100 |
| F | 1.78 | 1.78 | 1.78 | 1.78 | 1.78 |
| nd | 1.864 | 1.864 | 1.864 | 1.884 | 1.867 |
| νd | 40.6 | 40.6 | 40.6 | 39.6 | 40.4 |
| Tg (° C.) | 607 | 607 | 608 | 614 | 610 |

TABLE 6

EXAMPLE COMPOSITION (mass %)

| | No. | | | | |
|---|---|---|---|---|---|
| | 28 | 29 | 30 | 31 | 32 |
| $SiO_2$ | 5.45 | 5.45 | 5.45 | 3.41 | 5.45 |
| $B_2O_3$ | 12.34 | 12.01 | 13.54 | 15.57 | 13.23 |
| $La_2O_3$ | 37.23 | 32.57 | 32.06 | 33.59 | 32.88 |
| $Gd_2O_3$ | 10.99 | 10.18 | 10.18 | 10.18 | 10.18 |
| $ZrO_2$ | 6.11 | 6.11 | 6.11 | 6.11 | 6.11 |
| $Nb_2O_5$ | 1.53 | 2.04 | 3.05 | 1.53 | 2.54 |
| $Ta_2O_5$ | 19.85 | 19.85 | 19.85 | 19.85 | 19.85 |
| $WO_3$ | 0.00 | 2.44 | 2.44 | 2.44 | 2.44 |
| ZnO | 5.60 | 5.60 | 5.60 | 5.60 | 5.60 |
| $Li_2O$ | 0.81 | 1.63 | 1.63 | 1.63 | 1.63 |
| $Sb_2O_3$ | 0.10 | 0.10 | 0.10 | 0.10 | 0.10 |
| $GeO_2$ | | 2.04 | | | |
| $Lu_2O_3$ | | | | | |
| $Gd_2O_3 + Nb_2O_5 + GeO_2$ | 12.52 | 14.25 | 13.23 | 11.70 | 12.72 |
| TOTAL AMOUNT | 100 | 100 | 100 | 100 | 100 |
| F | 1.78 | 1.78 | 1.78 | 1.78 | 1.78 |
| nd | 1.867 | 1.859 | 1.857 | 1.853 | 1.855 |
| νd | 40.4 | 39.3 | 39.0 | 40.0 | 39.4 |
| Tg (° C.) | 608 | 577 | 576 | 570 | 579 |

TABLE 7

COMPARATIVE EXAMPLE COMPOSITION (mass %)

| | No. | | | | | | |
|---|---|---|---|---|---|---|---|
| | A | B | C | D | E | F | G |
| $SiO_2$ | 12.00 | 5.00 | 6.00 | 4.50 | 4.49 | 3.00 | 3.00 |
| $B_2O_3$ | 11.90 | 16.30 | 11.00 | 15.50 | 14.97 | 16.30 | 17.00 |
| $Al_2O_3$ | 1.00 | | | | | | |
| $Y_2O_3$ | | 8.60 | 5.00 | | | 2.00 | 2.00 |
| $La_2O_3$ | 32.00 | 38.40 | 33.00 | 35.00 | 35.43 | 45.00 | 46.40 |
| $Gd_2O_3$ | 33.00 | 9.60 | 25.00 | 10.00 | 7.98 | | |
| $ZrO_2$ | 2.00 | 5.00 | 4.00 | 5.00 | 4.99 | 5.00 | 3.00 |
| $Nb_2O_5$ | | | | | | 3.00 | 7.00 |
| $Ta_2O_5$ | 7.10 | 15.70 | 9.00 | 25.00 | 21.16 | 11.00 | 9.30 |
| $WO_3$ | | 1.40 | 7.00 | 5.00 | 4.99 | 11.70 | 12.30 |
| ZnO | | | | | 1.80 | 1.00 | |
| $Li_2O$ | 1.00 | | | | 0.20 | | |
| PbO | | | | | 3.99 | | |
| $Yb_2O_3$ | | | | | | 2.00 | |
| TOTAL AMOUNT | 100 | 100 | 100 | 100 | 100 | 100 | 100 |
| F | 3.63 | | | | | | |
| nd | 1.804 | 1.851 | 1.882 | 1.872 | 1.875 | 1.881 | 1.884 |
| νd | 47.2 | 42.9 | 40.6 | 38.6 | 37.8 | 37.7 | 36.4 |
| Tg (° C.) | 673 | 709 | 739 | 701 | 655 | 675 | 674 |

TABLE 8

COMPARATIVE EXAMPLE COMPOSITION (mass %)

| No. | H |
|---|---|
| $SiO_2$ | 2.00 |
| $B_2O_3$ | 10.00 |
| $La_2O_3$ | 40.00 |
| $Gd_2O_3$ | 10.00 |
| $Lu_2O_3$ | 5.00 |
| $ZrO_2$ | 2.50 |
| $Nb_2O_5$ | 1.00 |
| $Ta_2O_5$ | 18.50 |
| ZnO | 1.00 |
| $GeO_2$ | 10.00 |
| TOTAL AMOUNT | 100 |
| nd | 1.894 |
| νd | 40.9 |
| Tg (° C.) | 707 |

The optical glasses of the examples of the present invention (No. 1 to No. 32) shown in Tables 1 to 6 were obtained in the following processes. General optical glasses materials such as oxides, hydroxides, carbonates, nitrates, fluorides and the like were weighed by their mass proportions according to be the composition of the examples shown in Tables 1 to 6. The mixed glass materials were installed to a platinum crucible of 300 cc volume and were melted, clarified and stirred at 1200° C. to 1400° C. for 3 to 6 hours depending on their meltability based on the compositions. The homogenized molten glasses were cast into a metal molding die or the like and annealed.

As shown in Tables 1 to 6, all the optical glasses of the examples of the present invention (No. 1 to No. 32) have the optical constants (refractive index ($n_d$) and Abbe number ($v_d$)) within the above-described specific area and the transition point (Tg) in a range of 550 to 650° C. Thus, their optical glasses are suitable for the glass preform material for precision mold pressing and precision mold pressing.

On the contrary, as shown in Tables 7 and 8, the glass of the comparative example No. A (the example 6 of the above-described Publication 1) contains fluorine, but has transition temperature (Tg) of more than 650° C. Therefore, it is difficult to be applied to precision mold pressing. Further, the optical constants are not within the above-described specific area. With respect to the glasses of the comparative example No. B (the example 1 of the above-described Publication 2), the comparative example No. C (the example 2 of the above-described Publication 2), the comparative example No. D (the example 2 of the above-described Publication 3), the comparative example No. E (the example 5 of the above-described Publication 3), the comparative example No. F (the example 2 of the above-described Publication 4), the comparative example No. G (the example 3 of the above-described Publication 4) and the comparative example No. H (the example 4 of the above-described Publication 5), all of them have the optical constants within the above-described specific area. However, since their transition temperature (Tg) is more than 650° C., it is difficult to be applied to precision mold pressing.

Next, the devitrification test will be explained. 50 cc of examples No. 17, 25, 28 and 30 and No. I, J, K and L having the compositions of described below were respectively installed into a platinum crucible and melted in an electric furnace at 1300° C. for 1 hour in order to be the complete glass molten. Successively the temperature was lowered and kept at 1150° C., 1180° C. or 1200° C. for 2 hours, and the crucibles were taken out from the furnace. The condition of the glass moltens in a crucible are visually observed.

The composition of the comparative example 17 is based on that of the example 17, except 4.58 mass % of La$_2$O$_3$ component was substituted with Y$_2$O$_3$. The comparative examples J, K, and L had same compositions of the example 23 and 28 of the above-described Publication 7 (their compositions shown in Publication 7 are converted from mol % to mass %) and the example 4 of the above-described Publication 6 respectively.

A circle mark (○) indicates that devitrification was generated, and a cross mark (x) indicates that devitrification was not generated. As shown in Table 9, the molten glasses of the example of the present invention are superior in resistance to devitrification property to the comparative example I to L. Particularly, from the example 17 and the comparative example I, it is found that the resistance to devitrification property degrades when the glass contains Y$_2$O$_3$.

TABLE 9

|  | EXAMPLE | | | | COMPARATIVE EXAMPLE | | | |
| --- | --- | --- | --- | --- | --- | --- | --- | --- |
|  | 17 | 25 | 28 | 30 | I | J | K | L |
| SiO$_2$ | 4.09 | 5.39 | 5.39 | 5.45 | 4.09 | 5.99 | 5.95 | 7.30 |
| B$_2$O$_3$ | 13.23 | 12.28 | 12.34 | 13.54 | 13.23 | 10.75 | 10.33 | 9.40 |
| Y$_2$O$_3$ |  |  |  |  | 4.58 |  |  |  |
| La$_2$O$_3$ | 35.50 | 37.94 | 37.23 | 32.06 | 30.92 | 25.97 | 25.79 | 45.80 |
| Gd$_2$O$_3$ | 7.13 | 8.65 | 10.99 | 10.18 | 7.13 | 28.90 | 28.69 | 10.00 |
| ZrO$_2$ | 6.35 | 6.11 | 6.11 | 6.11 | 6.35 | 3.07 | 3.66 | 7.20 |
| Nb$_2$O$_5$ | 5.09 | 1.02 | 1.53 | 3.05 | 5.09 |  |  | 1.20 |
| Ta$_2$O$_5$ | 20.36 | 19.85 | 19.85 | 19.85 | 20.36 | 9.90 | 10.93 | 13.90 |
| WO$_3$ |  |  |  | 2.44 |  | 6.93 | 6.89 |  |
| ZnO | 5.09 | 5.6 | 5.6 | 5.6 | 5.09 | 7.3 | 6.44 | 5.00 |
| Li$_2$O | 1.02 | 1.02 | 0.81 | 1.63 | 1.02 | 1.19 | 1.33 |  |
| Sb$_2$O$_3$ | 0.10 | 0.10 | 0.10 | 0.10 | 0.10 |  |  | 0.20 |
| GeO$_2$ | 2.04 | 2.04 |  |  | 2.04 |  |  |  |
| TOTAL | 100 | 100 | 100 | 100 | 100 | 100 | 100 | 100 |
| F | 1.78 | 1.78 | 1.78 | 1.78 | 1.78 |  |  |  |
| DEVITRIFICATION TEST |  |  |  |  |  |  |  |  |
| 1200° C. | no data | ○ | ○ | ○ | no data | X | X | X |
| 1180° C. | no data | ○ | ○ | ○ | no data | X | X | X |
| 1150° C. | ○ | X | ○ | ○ | X | X | X | X |

The entire disclosure of Japanese Patent Application No. 2002-365851 filed on Dec. 17, 2002 including specification, claims, drawings and summary is incorporated herein by reference in its entirety.

What is claimed is:

1. An optical glass having:
   a refractive index (n$_d$) and an Abbe number (v$_d$) which are within an area surrounded by straight lines that are drawn by connecting point A (n$_d$=1.835, v$_d$=46.5), point B (n$_d$=1.90, v$_d$=40.0), point C (n$_d$=1.90, v$_d$=35.0) and point D (n$_d$=1.835, v$_d$=38.0) in a sequence of A, B, C, D and A as border lines in x-y orthogonal coordinates shown in FIG. 1, in which X-axis is the Abbe number (v$_d$) and Y-axis is the refractive index (n$_d$), the area including the border lines; the optical glass comprising:
   0.1 to 8 mass % of SiO$_2$;
   5 to less than 20 mass % of B$_2$O$_3$;
   15 to 50 mass % of La$_2$O$_3$;
   0.1 to 30 mass % Gd$_2$O$_3$,
   0 to 10 mass % of GeO$_2$ and
   0 to 8 mass % of Nb$_2$O$_5$,
   where a total content of Gd$_2$O$_3$, GeO$_2$ and Nb$_2$O$_5$ is more than 10 mass % to 30 mass %;
   0 to 5 mass % of Yb$_2$O$_3$;
   0 to 1 mass % of TiO$_2$;
   0 to 8 mass % of ZrO$_2$;
   more than 19 to 25 mass % of Ta$_2$O$_5$;
   0 to 10 mass % of WO$_3$;
   0 to 15 mass % of ZnO;
   0 to 5 mass % of RO,
   where RO is one or more kinds of oxides selected from CaO, SrO and BaO;
   more than 0.5 to less than 3 mass % of Li$_2$O;
   0 to 1 mass % of Sb$_2$O$_3$; and
   0 to 6 mass % in a total content of fluorides of above-described metal elements as F element with which a part or all of one or more kinds of oxides of above-described metal elements are substituted;
   wherein the optical glass has a transition temperature (Tg) of 650° C. or less.

2. The optical glass as claimed in claim 1, comprising 0.1 to less than 5.5 mass % of SiO$_2$.

3. The optical glass as claimed in claim 1, comprising more than 1 to less than 3 mass % of Li$_2$O.

4. The optical glass as claimed in claim 1, having the refractive index (n$_d$) of less than 1.875.

5. The optical glass as claimed in claim 1, having the refractive index (n$_d$) of 1.875 or more.

6. The optical glass as claimed in claim 1, having the refractive index (n$_d$) of more than 1.85.

7. The optical glass as claimed in claim 1, having the Abbe number (v$_d$) of less than 39.5.

8. The optical glass as claimed in claim 1, having the Abbe number (v$_d$) of 39.5 or more.

9. The optical glass as claimed in claim 1, having the transition temperature (Tg) of 640° C. or less.

10. The optical glass as claimed in claim 1, having the transition temperature (Tg) of 630° C. or less.

11. The optical glass as claimed in claim 2, comprising more than 1 to less than 3 mass % of $Li_2O$.

12. The optical glass as claimed in claim 4, having the Abbe number ($v_d$) of 39.5 or more.

13. The optical glass as claimed in claim 12, having the refractive index ($n_d$) of more than 1.85.

14. The optical glass as claimed in claim 5, having the Abbe number ($v_d$) of less than 39.5.

15. An optical glass having: a refractive index ($n_d$) and an Abbe number ($v_d$) which are within an area surrounded by straight lines that are drawn by connecting point A ($n_d$=1.835, $v_d$=46.5), point B ($n_d$=1.90, $v_d$=40.0), point C ($n_d$=1.90, $v_d$=35.0) and point D ($n_d$=1.835, $v_d$=38.0) in a sequence of A, B, C, D and A as border lines in x-y orthogonal coordinates shown in FIG. 1, in which X-axis is the Abbe number ($v_d$) and Y-axis is the refractive index ($n_d$), the area including the border lines; the optical glass comprising:

0.1 to 8 mass % of $SiO_2$;
5 to less than 20 mass % of $B_2O_3$;
15 to 50 mass % of $La_2O_3$;
0.1 to 30 mass % of $Gd_2O_3$,
more than 19 to 25 mass % of $Ta_2O_5$; and
more than 0.5 to less than 3 mass % of $Li_2O$; and
0 to 10 mass % of $GeO_2$ and/or
0 to 8 mass % of $Nb_2O_5$,
where a total content of $Gd_2O_3$, $GeO_2$ and $Nb_2O_5$ is more than 10 mass % to 30 mass %;
and/or
0 to 5 mass % of $Yb_2O_3$; and/or
0 to 1 mass % of $TiO_2$; and/or
0 to 8 mass % of $ZrO_2$; and/or
0 to 10 mass % of $WO_3$; and/or
0 to 15 mass % of ZnO; and/or
0 to 5 mass % of RO,
where RO is one or more kinds of oxides selected from CaO, SrO and BaO;
0 to 1 mass % of $Sb_2O_3$; and/or
0 to less than 0.5 mass % of $Lu_2O_3$; and
0 to 6 mass % in the total content of fluorides of above-described metal elements as F element with which a part or all of one or more kinds of oxides of above-described metal elements are substituted;
wherein the optical glass has a transition temperature (Tg) of 650° C. or less.

16. The optical glass as claimed in claim 15, comprising 0.1 to less than 5.5 mass % of $SiO_2$.

17. The optical glass as claimed in claim 15, comprising more than 1 to less than 3 mass % of $Li_2O$.

18. The optical glass as claimed in claim 15, having the refractive index ($n_d$) of less than 1.875.

19. The optical glass as claimed in claim 15, having the refractive index ($n_d$) of 1.875 or more.

20. The optical glass as claimed in claim 15, having the refractive index ($n_d$) of more than 1.85.

21. The optical glass as claimed in claim 15, having the Abbe number ($v_d$) of less than 39.5.

22. The optical glass as claimed in claim 15, having the Abbe number ($v_d$) of 39.5 or more.

23. The optical glass as claimed in claim 15, having the transition temperature (Tg) of 640° C. or less.

24. The optical glass as claimed in claim 15, having the transition temperature (Tg) of 630° C. or less.

25. The optical glass as claimed in claim 16, comprising more than 1 to less than 3 mass % of $Li_2O$.

26. The optical glass as claimed in claim 18, having the Abbe number ($v_d$) of 39.5 or more.

27. The optical glass as claimed in claim 26, having the refractive index ($n_d$) of more than 1.85.

28. The optical glass as claimed in claim 19, having the Abbe number ($v_d$) of less than 39.5.

29. The optical glass as claimed in claim 1, having the total content of the fluorides of 0.1 to 6 mass %.

30. The optical glass as claimed in claim 29, having the transition temperature (Tg) of 550 to 650° C.

31. The optical glass as claimed in claim 15, having the total content of the fluorides of 0.1 to 6 mass %.

32. The optical glass as claimed in claim 31, having the transition temperature (Tg) of 550 to 650° C.

* * * * *

Disclaimer

7,335,614 — Susumu Uehara, Sagamihara (JP); Koji Shimizu, Sagamihara (JP); and Shinya Mashiko, Sagamihara (JP). OPTICAL GLASS. Patent dated February 26, 2008. Disclaimer filed September 21, 2007, by the assignee Kabushiki Kaisha Ohara, Sagamihara (JP).

The term of this patent should not extend beyond the expiration date of Patent No. 7,183,349.
*(Official Gazette November 25, 2008)*

Disclaimer

7,335,614 B2 — Susumu Uehara, Sagamihara (JP); Koji Shimizu, Sagamihara (JP); and Shinya Mashiko, Sagamihara (JP). OPTICAL GLASS. Patent dated February 26, 2008. Disclaimer filed November 18, 2008, by the assignee, Kabushiki Kaisha Ohara.

The term of this patent shall not extend beyond the expiration date of Patent No. 7,138,349 (not Patent No. 7,183,349 as printed in disclaimer notice published November 25, 2008).

*(Official Gazette, March 27, 2012)*